(12) United States Patent
Koo et al.

(10) Patent No.: US 11,913,089 B2
(45) Date of Patent: Feb. 27, 2024

(54) LOW-DENSITY CLAD STEEL SHEET HAVING EXCELLENT STRENGTH AND PLATEABILITY, AND MANUFACTURING METHOD THEREFOR

(71) Applicant: POSCO, Pohang-si (KR)

(72) Inventors: Min-Seo Koo, Gwangyang-si (KR); Tae-Jin Song, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 487 days.

(21) Appl. No.: 17/263,217

(22) PCT Filed: Jul. 25, 2019

(86) PCT No.: PCT/KR2019/009268
§ 371 (c)(1),
(2) Date: Jan. 26, 2021

(87) PCT Pub. No.: WO2020/032446
PCT Pub. Date: Feb. 13, 2020

(65) Prior Publication Data
US 2021/0292867 A1    Sep. 23, 2021

(30) Foreign Application Priority Data
Aug. 7, 2018    (KR) .................. 10-2018-0091532

(51) Int. Cl.
*C21D 9/50* (2006.01)
*B32B 15/01* (2006.01)
(Continued)

(52) U.S. Cl.
CPC .............. *C21D 9/50* (2013.01); *B32B 15/013* (2013.01); *C21D 6/001* (2013.01); *C21D 6/005* (2013.01);
(Continued)

(58) Field of Classification Search
None
See application file for complete search history.

(56) References Cited

U.S. PATENT DOCUMENTS

2009/0202382 A1    8/2009    Kim et al.
2009/0297387 A1   12/2009    Chin et al.
(Continued)

FOREIGN PATENT DOCUMENTS

CN    103827336    5/2014
CN    106086658   11/2016
(Continued)

OTHER PUBLICATIONS

Chinese Office Action—Chinese Application No. 201980042388.2 dated Mar. 23, 2022, citing CN 103168105, KR 10-2009-0123229, CN 103827336, CN 107109588, CN 106086658, and KR 10-2017-0075138.
(Continued)

*Primary Examiner* — Anthony M Liang
(74) *Attorney, Agent, or Firm* — CANTOR COLBURN LLP

(57) ABSTRACT

Provided is a density clad steel sheet having excellent strength and plateability, the clad steel sheet including a base metal, and a clad material provided at both sides of the base metal, wherein the base metal is a ferrite-austenitic duplex lightweight steel sheet comprising, by wt %, 0.3-0.7% of C, 2.0-9.0% of Mn, 4.5-8.0% of Al and the balance of Fe and inevitable impurities, and the clad material is a ferrite carbon steel comprising, by wt %, 0.0005-0.2% of C, 0.05-2.5% of Mn and the balance of Fe and inevitable impurities.

13 Claims, 4 Drawing Sheets

(51) Int. Cl.
  *C21D 9/46* (2006.01)
  *C21D 8/02* (2006.01)
  *C21D 6/00* (2006.01)
  *C22C 38/14* (2006.01)
  *C22C 38/12* (2006.01)
  *C22C 38/08* (2006.01)
  *C22C 38/06* (2006.01)
  *C22C 38/04* (2006.01)
  *C22C 38/02* (2006.01)
  *C22C 38/00* (2006.01)
  *C23C 2/02* (2006.01)

(52) U.S. Cl.
  CPC ........... *C21D 6/008* (2013.01); *C21D 8/0205* (2013.01); *C21D 8/0226* (2013.01); *C21D 8/0236* (2013.01); *C21D 8/0273* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C23C 2/02* (2013.01); *C23C 2/022* (2022.08); *C23C 2/024* (2022.08); *C21D 2211/001* (2013.01); *C21D 2211/005* (2013.01)

(56) References Cited

U.S. PATENT DOCUMENTS

| | | |
|---|---|---|
| 2010/0003540 A1 | 1/2010 | Koseki et al. |
| 2013/0189539 A1 | 7/2013 | Van De Langkruis et al. |
| 2013/0295409 A1 | 11/2013 | Chin et al. |
| 2014/0342183 A1 | 11/2014 | Wakabayashi et al. |
| 2018/0002771 A1 | 1/2018 | Han et al. |
| 2019/0153559 A1 | 5/2019 | Song et al. |

FOREIGN PATENT DOCUMENTS

| | | | |
|---|---|---|---|
| CN | 104928569 | 3/2017 | |
| CN | 107109588 | 8/2017 | |
| EP | 2128293 | 12/2009 | |
| JP | 2009287114 | 12/2009 | |
| JP | 2010077531 | 4/2010 | |
| JP | 2014501852 | 1/2014 | |
| JP | 2019524986 | 9/2019 | |
| KR | 20070067950 | 6/2007 | |
| KR | 20090038008 | 4/2009 | |
| KR | 20090123229 | 12/2009 | |
| KR | 20160082358 | 7/2016 | |
| KR | 20170075138 | 7/2017 | |
| KR | 20170075138 A * | 7/2017 | ............ B21B 15/04 |

OTHER PUBLICATIONS

Japanese Office Action—Japanese Application No. 2021-505639 dated Mar. 15, 2022, citing JP 2014-501852, JP 2009-287114, JP 2019-524986, and KR 10-2017-0075138.

International Search Report—PCT/KR2019/009268 dated Nov. 15, 2019.

European Search Report—European Application No. 19847405.8 dated Sep. 15, 2021, citing US 2013/0189539, EP 2128293, CN 104928569, KR 10-2017-0075138, Serajzadeh, et al., and Sohn, et al.

Serajzadeh, et al., Prediction of temperature distribution in the hot rolling of slabs, Modelling Simul. Mater. Sci. Eng., 2002, vol. 10, pp. 185-203.

Sohn, et al., Effects of aluminum content on cracking phenomenon occurring during cold rolling of three ferrite-based lightweight steel, Acta Materialia, 2013, vol. 61, pp. 5626-5635.

* cited by examiner

LOW-DENSITY CLAD STEEL SHEET HAVING EXCELLENT STRENGTH AND PLATEABILITY, AND MANUFACTURING METHOD THEREFOR

TECHNICAL FIELD

The present disclosure relates to a low-density clad steel sheet having excellent strength and plateability, which may be used for exterior and interior structural components of vehicles, such as a door, a hood, and the like, and a manufacturing method therefor.

BACKGROUND ART

Recently, in accordance with the regulation of carbon dioxide for reducing global warming, there has been strong demand for reducing the weight of vehicles. As one method to reduce the weight of vehicles, a method of reducing a component weight through a design of reducing a thickness of a component using a high-strength steel sheet such as P-added ultra-low carbon steel, bake hardening steel, and two-phase structure steel has been used. However, when a thickness of the steel sheet is reduced, there may be a problem in which rigidity of a component may decrease, and thus, there may be a limitation in the component weight reduction for reducing a thickness of a steel sheet.

Meanwhile, aluminum or magnesium may be considered to be used as a lightweight material, but there may be a problem in which costs of manufacturing components using aluminum or magnesium may be high, and aluminum or magnesium may have low strength and ductility, such that it may be difficult to process aluminum or magnesium.

Japanese Laid-Open Patent Tuk Gae No. 2009-287114 suggests a method of lowering the density of steel by adding a large amount of aluminum, a light element, to carbon steel, and in order to reduce the density of steel, generally, 3.0 to 15.0% of aluminum may be added by weight unit. However, in this case, there may be a problem in which, by adding a large amount of aluminum having a higher oxidation tendency than that of iron, an aluminum oxide film may be formed on a surface of a steel material even in an annealing atmosphere under reduction conditions, such that plateability may degrade.

Therefore, it has been necessary to develop a steel sheet for vehicle which may have a density of 7.4 g/cm3 or less, which is lower than a general steel material by 5%, and a tensile strength of 780 MPa or more, and may thus have excellent component weight reduction efficiency and excellent plateability.

DISCLOSURE

Technical Problem

An aspect of the present disclosure is to provide a clad steel sheet having high strength and low density and also having excellent plateability, and a method of manufacturing the same.

A purpose of the present disclosure is not limited to the above-mentioned matter. The purpose of the present disclosure will be understood from the overall descriptions of the present specification, and there may be no difficulty for a person skilled in the art in the field to which the present disclosure belongs to understand the additional purpose of the present disclosure.

Technical Solution

An aspect of the present disclosure relates to a low-density clad steel sheet having excellent strength and plateability, the clad steel sheet including a base material and a clad material provided on both side surfaces of the base material, wherein the base material is a ferrite-austenitic duplex lightweight steel sheet including, by weight %, C: 0.3-0.7%, Mn: 2.0-9.0%, Al: 4.5-8.0%, and a balance of Fe and inevitable impurities, and wherein the clad material is ferrite carbon steel including, by weight %, C: 0.0005-0.2%, Mn: 0.05-2.5%, and a balance of Fe and inevitable impurities.

Another aspect of the present disclosure relates to method of manufacturing a low-density steel sheet having excellent strength and plateability, the method including preparing a base material, a ferrite-austenitic duplex lightweight steel sheet including, by weight %, C: 0.3-0.7%, Mn: 2.0-9.0%, Al: 4.5-8.0%, and a balance of Fe and inevitable impurities; preparing a clad material, ferrite carbon steel including, by weight %, C: 0.0005-0.2%, Mn: 0.05-2.5%, and a balance of Fe and inevitable impurities; obtaining a laminate by disposing the base material between the two clad materials; welding an edge of the laminate and heating the laminate in a temperature range of 1050-1350° C.; obtaining a hot rolled steel sheet by finish-rolling the heated laminate in a temperature range of 750-1050° C.; coiling the hot rolled steel sheet at 350-700° C.; obtaining a cold rolled steel sheet by pickling the coiled hot rolled steel sheet and performing cold-rolling by applying a cold rolling reduction ratio of 35-90%; and annealing the cold rolled steel sheet in a temperature range of 550° C. or higher and A3+50° C. or lower of the clad material.

The aforementioned solutions do not list all the features of the present disclosure. Various features of the present disclosure and advantages and effects therefrom will be understood in further detail with reference to the specific embodiments described below.

Advantageous Effects

According to the present disclosure, there may be an effect of providing a clad steel sheet having a specific density of 7.4 g/cm3 or less, tensile strength of 780 MPa or more, and also having excellent plateability so as to be able to be preferably applied to a steel sheet for vehicle, and a method of manufacturing the same. Also, there may be an effect in which cold press forming may be applied to the clad steel sheet.

BEST MODE FOR INVENTION

Figure 1:
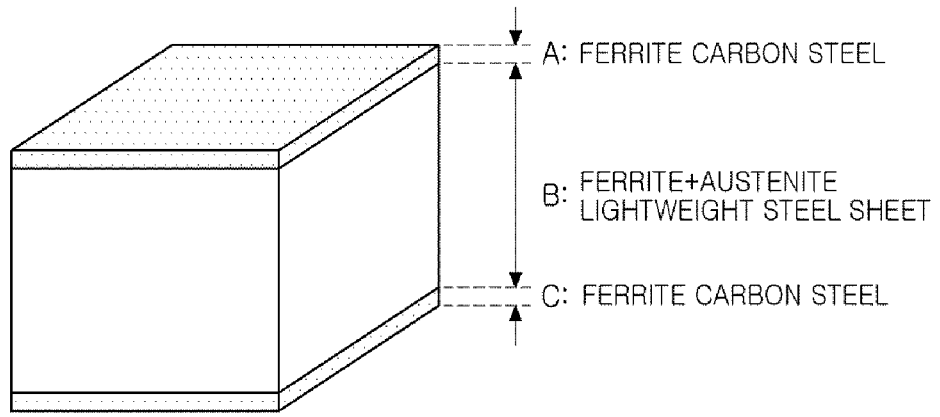
FIG. 1 is a view illustrating a clad steel sheet using a ferrite-austenite duplex lightweight steel sheet as a base material (B) and ferrite-based carbon steel as a clad material (A and C)

In the description below, preferable embodiments of the present disclosure will be described. However, embodiments of the present disclosure may be modified to various other forms, and the scope of the present disclosure is not limited to the embodiments described below. Also, embodiments of the present disclosure are provided to more completely describe the present disclosure to a person skilled in the art.

The present inventors recognized that it may be possible to manufacture a steel material having high tensile strength and low density as for a conventional lightweight steel sheet, but that there may be a problem in which aluminum oxide is generated on a surface by adding a large amount of aluminum such that plateability may degrade, and thus conducted a research to resolve the problem.

As a result, it has been indicated that, by manufacturing a composite steel sheet having excellent strength and an elongation rate by including a stable austenite phase in a ferrite base and having a low density by adding a large amount of aluminum, which uses a ferrite-austenite lightweight steel sheet containing a large amount of aluminum as a base material and ferrite carbon steel having excellent plateability as a clad material, strength and low density may be implemented, and it may be possible to manufacture an excellent steel sheet for vehicle which has excellent plateability, and the present disclosure has been suggested.

In the description below, a low density clad steel sheet having excellent strength and plateability according to an aspect of the present disclosure will be described in detail.

A low-density clad steel sheet having excellent strength and plateability according to one aspect of the present disclosure may include a base material and a clad material provided on both side surfaces of the base material, and the base material is a ferrite-austenitic duplex lightweight steel sheet including, by weight %, C: 0.3-0.7%, Mn: 2.0-9.0%, Al: 4.5-8.0%, and a balance of Fe and inevitable impurities, and the clad material is ferrite carbon steel including, by weight %, C: 0.0005-0.2%, Mn: 0.05-2.5%, and a balance of Fe and inevitable impurities.

In the description below, each of the base material and the clad material of the present disclosure will be described, and a clad steel sheet including a clad material provided on both side surfaces of the base material will be described.

Base Material (Ferrite-Austenite Duplex Lightweight Steel Sheet)

In the description below, an alloy composition of the lightweight steel sheet forming the base material of the clad steel sheet, an aspect of the present disclosure, will be described in detail. The "%," a unit of each elemental content, is "weight %" unless otherwise indicated.

Carbon (C): 0.3-0.7%

Carbon is an element that contributes to stabilization of an austenite phase, and the more the content thereof increases, it may be more advantageous in securing an austenite phase. Austenite distributed in a microstructure of a lightweight steel sheet may simultaneously increase strength and an elongation rate. When a content of carbon is less than 0.3%, it may be difficult to secure tensile strength and an elongation rate. When the content exceeds 0.7%, cementite and kappa carbide may be formed in the steel material such that strength may increase but ductility of the steel may significantly degrade. In particular, in the steel to which aluminum is added, kappa carbide may precipitate at ferrite grain boundaries and may cause brittleness, and thus, a preferable upper limit may be 0.7%. Therefore, a preferable carbon content in the present disclosure may be 0.3-0.7%.

Manganese (Mn): 2.0-9.0%

Manganese is an element that stabilizes an austenite phase along with carbon, and may increase solubility of carbon in an austenite phase, thereby preventing the formation of carbide. Also, as manganese may degrade density of steel by increasing a lattice constant of steel, manganese may lower density of steel. When a content of manganese is less than 2.0%, it may be difficult to expect an effect of preventing the formation of carbide, whereas, when the content exceeds 9.0%, a band structure may be formed by central segregation such that ductility may degrade. Therefore, a preferable manganese content in the present disclosure may be 2.0-9.0%.

Aluminum (Al): 4.5-8.0%

In the present disclosure, aluminum is the most important element which may reduce density of steel. To this end, it may be preferable to add aluminum by 4.5% or more. It may be preferable to add a large amount of aluminum to reduce density, but when a large amount of aluminum is added, kappa carbide or intermetallic compounds such as FeAl and $Fe_3Al$ may increase, such that ductility of the steel may degrade. Thus, it may be preferable to limit an upper limit thereof to 8.0%. Therefore, a preferable aluminum content in the present disclosure is 4.5-8.0%.

The remaining component of the base material is iron (Fe). Unintended impurities from a raw material or a surrounding environment may be inevitably mixed into in a normal manufacturing process, and may thus not be excluded. Since these impurities are known to a person skilled in the art in terms of the manufacturing process, the impurities will not be specifically mentioned in the present specification.

In addition to the above composition, the lightweight steel sheet forming the base material may further include, by weight %, Si: 0.03-2.0%, Ni: 0.1-4.0%, N: 0.04% or less (excluding 0%), P: 0.03% or less, and S: 0.03% or less.

Silicon (Si): 0.03-2.0%

Silicon may be added to improve a yield strength and tensile strength of steel by solid solution strengthening. Since silicon is used as a deoxidizing agent, silicon may be included in steel by generally 0.03% or more. When a content of silicon exceeds 2.0%, a large amount of silicon oxide may be formed on a surface during hot rolling, such that pickling properties may degrade and electrical resistivity may increase, which may deteriorate weldability. Therefore, a preferable content of silicon may be 0.03-2.0%.

Nickel (Ni): 0.1-4.0%

Nickel may increase strength and ductility by increasing stability of austenite along with manganese. Therefore, nickel may be added together with manganese to increase strength and ductility of steel, but when a large amount of nickel is added, there may be a problem in which the cost of manufacturing steel may increase. Thus, a preferable content thereof may be 4.0% or less. When nickel is added in an amount less than 0.1%, the effect of increasing strength and ductility may not be significant, and thus, a preferable content of nickel in the present disclosure may be 0.1-4.0%.

Nitrogen (N): 0.04% or Less (Excluding 0%)

Nitrogen is an inevitably added impurity, and by reacting with aluminum, nitrogen may precipitate fine nitride such that workability of steel may degrade. Thus, it may be preferable to lower the content as much as possible. In theory, it may be desirable to control a nitrogen content to be as low as possible, but nitrogen may be inevitably contained in the manufacturing process. Therefore, it may be important to manage an upper limit thereof, and in the present disclosure, a content of nitrogen may be managed to be 0.04% or less.

Phosphorus (P): 0.03% or Less

Phosphorus is an inevitably contained impurity, and may be a major cause of lowering workability of steel by segregation, and thus, it may be preferable to control the content to be as low as possible. In theory, it may be advantageous to limit the content of phosphorus to 0%, but phosphorus may be inevitably contained in the manufacturing process. Therefore, it may be important to manage an upper limit thereof, and in the present disclosure, the phosphorus content may be managed to be 0.03% or less.

Sulfur (S): 0.03% or Less

Sulfur is an inevitably contained impurity, and sulfur may form coarse manganese sulfide (MnS) such that sulfur may cause defects such as flange cracks, and sulfur may greatly reduce hole expandability of a steel sheet. Thus, it may be preferable to control the content to be as low as possible. In theory, it may be advantageous to limit a sulfur content to 0%, but sulfur may be inevitably included in the manufacturing process. Therefore, it may be important to manage an upper limit thereof, and in the present disclosure, the sulfur content may be managed to be 0.03% or less.

Meanwhile, the lightweight steel sheet forming the base material in the present disclosure may satisfy the above component and may also include a composite structure including ferrite and austenite as a microstructure of the steel sheet. The lightweight steel sheet may be a two-phase structure steel, duplex steel. More preferably, 10-50% of retained austenite may be included in a ferrite matrix by area fraction. By securing the microstructure as above, both the desired strength and an elongation rate may be secured.

Clad Material (Ferrite Carbon Steel)

In the description below, an alloy composition of ferrite carbon steel forming the clad material of the clad steel sheet, an aspect of the present disclosure, will be described in detail. A unit of each elemental content is "weight %" unless otherwise indicated.

Carbon (C): 0.0005-0.2%

Carbon is an element that is inevitably retained in a process of manufacturing molten iron, and even when a decarburization process of a steelmaking process is performed, 0.0005% or higher of carbon may be retained in steel. Also, carbon diffuses to austenite in an annealing process, and may allow pearlite, martensite, and bainite to be dispersed in a ferrite base in a cooling process after annealing, thereby improving strength of steel. When a content thereof exceeds 0.2%, weldability of a steel sheet may be deteriorated. Therefore, in the present disclosure, a preferable content of carbon may be 0.0005-0.2%.

Manganese (Mn): 0.05-2.5%

Manganese is an element that is dissolved in steel and may improve strength of a steel sheet. To sufficiently obtain such an effect, a preferable content thereof may be 0.05% or more. When the content exceeds 2.5%, formability of the steel sheet may be deteriorated. Therefore, a preferable content of manganese in the present disclosure may be 0.05-2.5%.

The remaining component of the base material is iron (Fe). However, unintended impurities from a raw material or a surrounding environment may be inevitably mixed in a normal manufacturing process, and may thus not be excluded. Since these impurities are known to a person skilled in the art in terms of the manufacturing process, the impurities will not be specifically mentioned in the present specification.

In addition to the above composition, ferrite carbon steel forming the clad material may further include, by weight %, Al: 0.01-0.1%, N: 0.04% or less (excluding 0%), P: 0.03% or less, and S: 0.03% or less.

Aluminum (Al): 0.01-0.1%

Aluminum may improve strength of steel by interfering with the formation of iron carbide and securing a low-temperature transformation phase such as martensite and bainite. Generally, aluminum may be added for deoxidation, and excessive costs may be incurred to control a content thereof to be less than 0.01%. When the content exceeds 0.1%, surface oxides may be formed in annealing such that plateability may be deteriorated. Thus, a preferable content of aluminum may be 0.01-0.1%.

Nitrogen (N): 0.04% or Less (Excluding 0%)

Nitrogen is an inevitably contained element and may react with aluminum retained in steel such that aluminum nitride (AlN) may be formed, and aluminum nitride may cause surface cracks during continuous casting. Therefore, it may be desirable to control the content to be as low as possible, but nitrogen is inevitably contained in the manufacturing process. It may be important to manage an upper limit of nitrogen, and in the present disclosure, a preferable nitrogen content may be 0.04% or less.

Phosphorus (P): 0.03% or Less

Phosphorus is an inevitably contained impurity and may be a main cause of lowering workability of steel by segregation, and thus, it may be preferable to control a content thereof to be as low as possible. In theory, it may be advantageous to limit the content of phosphorus to 0%, but phosphorus may be inevitably contained in the manufacturing process. Therefore, it may be important to manage an upper limit thereof, and in the present disclosure, a preferable phosphorus content may be 0.03% or less.

Sulfur (S): 0.03% or Less

Sulfur is an inevitably contained impurity and may form coarse manganese sulfide (MnS) such that sulfur may cause defects such as flange cracks. Sulfur may greatly degrade hole expandability of the steel sheet, and thus, it may be preferable to control a content thereof to be as low as possible. In theory, it may be advantageous to limit a content of sulfur to 0%, but sulfur may be inevitably contained in the manufacturing process. Therefore, it may be important to manage an upper limit thereof, and in the present disclosure, a preferable sulfur content may be 0.03% or less.

Also, in addition to the composition, the ferrite carbon steel forming the clad material may further include, by weight %, one or more of Si: 0.03-2.0%, Ti: 0.005-0.05%, and Nb: 0.005-0.05%.

Silicon (Si): 0.03-2.0%

Silicon may be dissolved in a steel sheet and may improve strength of the steel, and may prevent the growth of iron carbide and may thus secure retained austenite, thereby improving an elongation rate of the steel. Silicon may be present as an impurity in molten steel, and excessive cost may be incurred to control silicon to be less than 0.03%. When a content thereof exceeds 2.0%, silicon may create surface oxide during annealing such that plateability may be deteriorated. Therefore, a preferable content of silicon may be 0.03-2.0%.

Titanium (Ti): 0.005-0.05%

Titanium may increase strength by reacting with nitrogen and carbon of steel and forming carbonitride. To this end, it may be preferable to contain titanium by 0.005% or more, and when the content exceeds 0.05%, excessive sediment may be formed, which may deteriorate castability. Therefore, a preferable content of titanium may be 0.005-0.05%.

Niobium (Nb): 0.005-0.05%

Niobium is a carbonitride-forming element such as titanium and may increase strength by reacting with nitrogen and carbon in a steel material. To this end, it may be preferable to include niobium by 0.005% or more, and when the content exceeds 0.05%, sediment may be excessively formed such that castability may be deteriorated. Therefore, a preferable content of niobium may be 0.005-0.05%.

Figure 3:
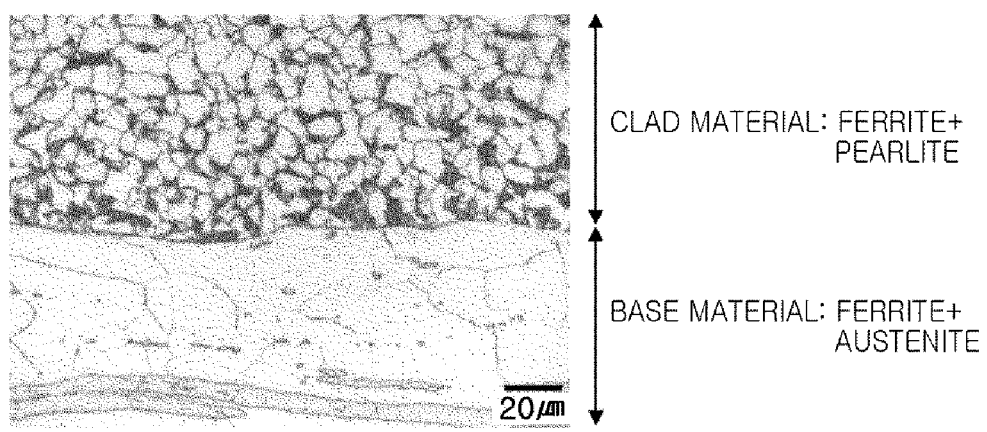
FIG. 3 is an image obtained by imaging an boundary portion of a base material and a clad material using an optical microscope.

Meanwhile, the ferrite carbon steel forming the clad material in the present disclosure may satisfy the above component, and a matrix structure thereof may be ferrite and may include at least one or more of carbide, pearlite, martensite, and bainite as a second phase. Also, as indicated in FIG. 3, pearlite may be formed on the base material side in the clad material of the clad steel sheet in the present disclosure. Pearlite of the clad material may be formed by carbon diffused from the base material, and it has been indicated that pearlite may be formed from a boundary to a certain depth, and may not affect plateability of the clad steel sheet. By securing the microstructure as above, formability and excellent plating adhesion may be secured.

Clad Steel Sheet

The clad steel sheet according to an aspect of the present disclosure may include the above-described base material and a clad material provided on both side surfaces of the base material.

A clad steel sheet may be defined as a laminated composite material in which surfaces of two or more metal materials are metallurgically bonded to be integrated. In general, as for a clad steel sheet, noble materials such as nickel (Ni) or copper (Cu) may be used as a clad material such that a clad steel sheet has been used for special purposes such as an extreme corrosive environment. In the present disclosure, to obtain both high strength, low density, and excellent plateability, the clad steel sheet having a composite structure of ferrite and austenite described above, using the lightweight steel sheet containing high aluminum as a base material, and including ferrite carbon steel as a clad material on both side surfaces of the base material has been suggested.

The base material, an internal steel material of the present disclosure, may be a ferrite-austenite-based lightweight steel sheet containing a large amount of aluminum, which may have excellent strength and an elongation rate by including a stable austenite phase in a ferrite matrix, and may have a low density by adding a large amount of aluminum. However, due to the high amount of aluminum added, aluminum oxide may be created on a surface during an annealing process, such that plateability may degrade, and thus, an exterior thereof may not be unsuitable to be used as a steel material for vehicle. The clad material, an external steel material, may be formed of ferrite carbon steel having excellent plateability.

As described above, by including the above-described base material and the clad material provided on both side surfaces of the base material, an effect of obtaining high strength and low density along with excellent plateability may be obtained.

Meanwhile, a gradient of element concentration caused by a difference in composition may occur between the base material and the clad material of the clad steel sheet of the present disclosure due to hot rolling and annealing processes of the manufacturing process, and diffusion of the elements may occur on an interfacial surface. Particularly, aluminum may move from the base material including a high content thereof to the clad material, such that a region including a high content of aluminum may be locally formed in the clad material. Accordingly, an aluminum diffusion layer having a certain thickness may be formed in the clad material of the clad steel sheet. When a thickness of the clad material is less than that of the aluminum diffusion layer, aluminum of the base material may diffuse to the surface of the clad material, and aluminum oxide may be formed on the surface of the clad material, such that there may be a problem in which it may not be possible to secure plateability. Therefore, it may be preferable for the thickness of one side surface of the clad material to be greater than that of the aluminum diffusion layer.

In the present disclosure, in consideration of the diffusion distance of aluminum, when the thickness of the clad layer is 25 $\mu$m or more, it has been confirmed that there may be no effect on plateability. Therefore, a preferable thickness of one side surface of the clad material may be 25 $\mu$m or more. The thickness of one side surface of the clad material refers to a thickness of a single clad material provided on one side surface of the base material, and the thickness of both side surfaces of the clad material refers to the sum of the thicknesses of two clad materials provided on both side surfaces of the base material.

Also, the sum of the thicknesses of both side surfaces of the clad material may be 30% or less of a total thickness of the clad steel sheet. The total thickness of the clad steel sheet refers to a sum of thicknesses of the base material and both side surfaces of the clad material, and if a plating layer is formed on one surface of the clad material, a thickness of the plating layer may also be included. When the thickness of the clad material is excessively thick, the density of 7.4 $g/cm^3$ or less to be obtained in the present disclosure may not be secured. When the density is 7.4 $g/cm^3$ or less, a weight reduction of 5% or more may be obtained as compared to a general steel material, and in the case of a component having the same weight, stiffness may increase by 15%. There may be differences depending on the content of aluminum contained in the base material, but when the thickness of the clad material is 30% or less than the thickness of the clad steel sheet, the density of the clad steel sheet may be secured by 7.4 $g/cm^3$ or less.

Also, the clad steel sheet may have tensile strength of 780 MPa or more, and an elongation rate of 30% or more. By securing such tensile strength and an elongation rate, the clad steel sheet may be preferably applied to vehicle structural members.

The clad steel sheet may further include a plating layer formed by a hot-dip plating method, and the plating layer may be one selected from a group consisting of Zn, Zn—Fe, Zn—Al, Zn—Mg, Zn—Mg—Al, Zn—Ni, Al—Si, and Al—Si—Mg.

A method of manufacturing a low density clad steel sheet having excellent strength and plateability, another aspect of the present disclosure, will be described in detail.

The method of manufacturing a low-density steel sheet having excellent strength and plateability may include preparing a base material, a ferrite-austenitic duplex lightweight steel sheet including, by weight %, C: 0.3-0.7%, Mn: 2.0-9.0%, Al: 4.5-8.0%, and a balance of Fe and other impurities; preparing a clad material, ferrite carbon steel including, by weight %, C: 0.0005-0.2%, Mn: 0.05-2.5%, and a balance of Fe and other impurities; obtaining a laminate by disposing the base material between the two clad materials; welding an edge of the laminate and heating the laminate in a temperature range of 1050-1350° C.;

obtaining a hot rolled steel sheet by finish-rolling the heated laminate in a temperature range of 750-1050° C.; coiling the hot rolled steel sheet at 350-700° C.; obtaining a cold rolled steel sheet by pickling the coiled hot rolled steel sheet and performing cold-rolling by applying a cold rolling reduction ratio of 35-90%; and annealing the cold rolled steel sheet in a temperature range of 550° C. or higher and A3+50° C. or lower of the clad material.

A base material and a clad material satisfying the above-described alloy composition may be prepared, the base material may be disposed between the two clad materials to obtain a laminate. In this case, the surfaces of the base material and the clad material may be cleaned before lamination.

The method of manufacturing the base material and the clad material is not limited in the present disclosure as a general manufacturing process may be applied for the method. However, as a preferable example, the base material may be manufactured by casting molten steel produced in an electric furnace or a blast furnace, and the clad material may be manufactured by refining and casting molten steel produced in the blast furnace and controlling a content of impurities inevitably contained.

Edges of the laminate may be welded, and may be heated to a temperature range of 1050-1350° C. By welding the edges of the laminate, it may be possible to prevent oxygen from entering to a region between the base material and the clad material, such that formation of oxide may be prevented during heating.

When the heating temperature is less than 1050° C., it may be difficult to secure a finish rolling temperature during hot rolling, and a rolling load may increase due to a decrease in temperature such that it may be difficult to perform sufficient rolling to a predetermined thickness. When the heating temperature exceeds 1350° C., the grain size increases, and surface oxidation may occur such that strength decreases, or the surface tends to be deteriorated, which may not be preferable. Also, since a liquid film may be formed on a columnar grain boundary of the cast slab, cracks may occur during subsequent hot rolling. Therefore, it may be preferable to limit the heating temperature to 1050-1350° C.

The heated laminate may be finish-rolled in a temperature range of 750-1050° C. to obtain a hot-rolled steel sheet. When the finish rolling temperature is less than 750° C., there may be a problem in which the rolling load may increase, which may adversely affect the rolling mill. When the finish rolling temperature exceeds 1050° C., there may be a concern that surface oxidation may occur during rolling. Therefore, a referable finish rolling temperature may be limited to 750-1050° C.

The hot-rolled steel sheet may be coiled at 350-700° C. When the coiling temperature is less than 350° C., a low-temperature transformation phase may be formed during cooling, such that strength of the hot-rolled steel sheet may increase excessively, and a rolling load may increase during cold-rolling. When the coiling temperature exceeds 700° C., a thick oxide film may be formed on the surface of the hot-rolled steel sheet, such that it may not be easy to control the oxide layer during a pickling process. Therefore, it may be preferable to limit the coiling temperature to 350-700° C.

After pickling the coiled hot-rolled steel sheet, a cold-rolled steel sheet may be obtained by performing cold rolling by applying a cold-rolling reduction ratio of 35-90%. When the cold-rolling reduction ratio is less than 35%, there may be a problem in which the ferrite carbon steel forming the clad material may not be recrystallized smoothly, which may deteriorate workability. When the cold-rolling reduction ratio exceeds 90%, there may be a problem in which a possibility of sheet fracture may increase due to a rolling load. Therefore, it is preferable to limit the cold rolling reduction ratio in the cold rolling process to 35-90%.

The cold-rolled steel sheet may be annealed in a temperature range of 550° C. or more and A3+50° C. or less of the clad material. A plurality of dislocations formed by the cold rolling may be reduced by static recrystallization during annealing, which may secure workability of the steel. When the annealing temperature is less than 550° C., sufficient workability may not be secured. When the annealing is performed at a temperature exceeding A3+50° C. of the clad material, the crystal grain size of the clad material becomes coarse such that strength of the steel may be reduced. Accordingly, a preferable annealing temperature may be a temperature range of 550° C. or higher and A3+50° C. or lower of the clad material.

The method may further include forming a plating layer by performing plating by a hot dip plating method after the annealing, and the plating layer is one selected from a group consisting of Zn, Zn—Fe, Zn—Al, Zn—Mg, Zn—Mg—Al, Zn—Ni, Al—Si, and Al—Si—Mg.

MODE FOR INVENTION

Hereinafter, the present disclosure will be described in greater detail through embodiments. However, it should be noted that the following embodiments are suggested to describe the present disclosure in greater detail, and are not intended to limit the scope of the present disclosure. This is because the scope of the present disclosure is determined by matters described in the claims and matters reasonably inferred therefrom.

Embodiment

A steel ingot of carbon steel and a lightweight steel sheet having the component composition as in Table 1 below was prepared, the surface of the steel ingot was cleaned, the lightweight steel sheet was disposed between the two carbon steels to manufacture a three-ply laminate to have a lamination ratio as in Table 2. Thereafter, arc welding was performed using a welding rod along a boundary surface of the laminate. The laminate to which the boundary surface was welded was reheated in a heating furnace at 1150° C. for 1 hour and was rolled at a finish rolling temperature of 900° C., thereby manufacturing a hot-rolled steel sheet. Thereafter, the hot-rolled steel sheet was coiled at 550° C., was pickled, and was cold-rolled at a cold-rolling reduction ratio of 50%, thereby manufacturing a cold-rolled steel sheet. Thereafter, annealing was performed in an N2 atmosphere containing 5% of H2 at an annealing temperature of 820° C. and hot-dip galvanization was performed.

Mechanical properties and plateability were measured for each manufactured sample, and are listed in Table 2 below. A tensile test was conducted using a universal tensile tester, and yield strength (YS), tensile strength (TS), uniform elongation (UEL), and total elongation (TEL) were measured. The unit of yield strength (YS) and tensile strength (TS) is MPa, and the unit of a total elongation rate (TEL) is %.

Density was measured by manufacturing a steel sheet having a size of 100×100 mm, measuring the weight at room temperature, hanging the steel sheet on a wire having a diameter of 0.05 mm, immersing the steel sheet in a beaker containing water at room temperature, and measuring the weight. The density of water, a reference, was 1 g/cc.

As for plateability, by observing an exterior, samples in which unplating did not occur are marked "0," and samples in which the surface was defective such as unplating are marked "X."

TABLE 1

| SAMPLE NAME | C | Si | Mn | P | S | Al | Ni | Ti | Nb | N |
|---|---|---|---|---|---|---|---|---|---|---|
| CARBON STEEL 1 | 0.0017 | | 0.1 | 0.009 | 0.0045 | 0.03 | | 0.021 | 0.011 | 0.0020 |
| CARBON STEEL 2 | 0.039 | | 0.25 | 0.009 | 0.0051 | 0.03 | | | | 0.0028 |
| CARBON STEEL 3 | 0.08 | 0.3 | 1.8 | 0.013 | 0.0015 | 0.03 | | | | 0.0040 |
| CARBON STEEL 4 | 0.07 | 0.6 | 2.3 | 0.012 | 0.0027 | 0.04 | | | 0.025 | 0.0044 |
| LIGHTWEIGHT 1 | 0.35 | | 3.5 | 0.0095 | 0.0026 | 5.8 | | | | 0.0060 |
| LIGHTWEIGHT 2 | 0.500 | 0.5 | 6.1 | 0.011 | 0.003 | 6.1 | | | | 0.0043 |
| LIGHTWEIGHT 3 | 0.600 | | 2.5 | 0.009 | 0.003 | 7.6 | 2.500 | | | 0.0028 |

In Table 1, the unit of each element content is weight percent.

TABLE 2

| CLASSIFICATION | COMBINATION CLAD | COMBINATION BASE MATERIAL | THICKNESS (mm) CLAD | THICKNESS (mm) BASE MATERIAL | THICKNESS RATIO CLAD | THICKNESS RATIO BASE MATERIAL | THICKNESS OF AL DIFFUSION LAYER (μm) | YS | TS | TE1 | DENSITY | PLATEABILITY |
|---|---|---|---|---|---|---|---|---|---|---|---|---|
| COMPARATIVE EXAMPLE 1 | CARBON STEEL 1 | LIGHT WEIGHT 1 | 0.03 | 1.37 | 0.02 | 0.98 | 20 | 624 | 840 | 33 | 7.26 | X |
| COMPARATIVE EXAMPLE 2 | CARBON STEEL 1 | LIGHT WEIGHT 1 | 0.47 | 0.93 | 0.33 | 0.67 | 21 | 478 | 668 | 38 | 7.42 | ○ |
| INVENTIVE EXAMPLE 1 | CARBON STEEL 1 | LIGHT WEIGHT 1 | 0.18 | 1.23 | 0.53 | 0.88 | 20 | 577 | 784 | 34 | 7.31 | ○ |
| INVENTIVE EXAMPLE 2 | CARBON STEEL 2 | LIGHT WEIGHT 1 | 0.18 | 1.23 | 0.13 | 0.88 | 20 | 584 | 790 | 34 | 7.31 | ○ |
| INVENTIVE EXAMPLE 3 | CARBON STEEL 3 | LIGHT WEIGHT 1 | 0.23 | 1.17 | 0.17 | 0.83 | 21 | 593 | 821 | 31 | 7.33 | ○ |
| INVENTIVE EXAMPLE 4 | CARBON STEEL 4 | LIGHT WEIGHT 1 | 0.23 | 1.17 | 0.17 | 0.83 | 21 | 614 | 855 | 30 | 7.33 | ○ |
| INVENTIVE EXAMPLE 5 | CARBON STEEL 1 | LIGHT WEIGHT 2 | 0.20 | 1.20 | 0.14 | 0.86 | 22 | 639 | 800 | 38 | 7.34 | ○ |
| INVENTIVE EXAMPLE 6 | CARBON STEEL 3 | LIGHT WEIGHT 2 | 0.20 | 1.20 | 0.14 | 0.86 | 21 | 669 | 851 | 35 | 7.34 | ○ |
| INVENTIVE EXAMPLE 7 | CARBON STEEL 4 | LIGHT WEIGHT 2 | 0.20 | 1.20 | 0.14 | 0.86 | 22 | 688 | 881 | 34 | 7.34 | ○ |
| INVENTIVE EXAMPLE 8 | CARBON STEEL 1 | LIGHT WEIGHT 3 | 0.23 | 1.17 | 0.17 | 0.83 | 23 | 566 | 783 | 39 | 7.24 | ○ |
| INVENTIVE EXAMPLE 9 | CARBON STEEL 3 | LIGHT WEIGHT 3 | 0.28 | 1.12 | 0.20 | 0.80 | 22 | 593 | 836 | 36 | 7.27 | ○ |

As indicated Tables 1 and 2, Inventive Examples 1 to 9 satisfying both the composition and the microstructure of the present disclosure secured tensile strength of 780 MPa or more, density of 7.4 g/cm3 or less, and an excellent plated surface.

In Comparative Example 1, the thickness of the clad material was at a level of 15 μm on one side surface, and aluminum of the base material was diffused into the clad layer such that aluminum oxide was formed on the surface, and plateability was secured.

In Comparative Example 2, the thickness ratio of the clad layer was 30% or more, such that the density of 7.4 g/cm3 or less was not secured.

Figure 2:
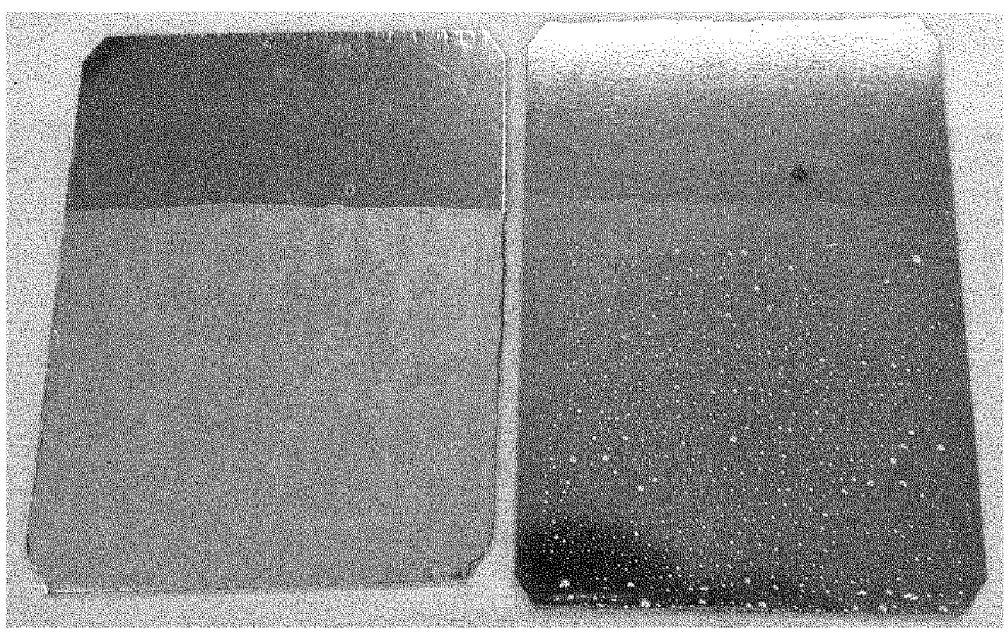
FIG. 2 is an image obtained by imaging an exterior of a hot-dip galvanized zinc material of inventive example 1 (left) and comparative example 1 (right)

FIG. 2 is an image obtained by imaging an exterior of a hot-dip galvanized material of inventive example 1 and comparative example 1. It has been indicated that, in Inventive Example 1, plateability of ferrite carbon steel, which is a clad material forming an external steel material, had excellent plateability, such that a clad steel sheet having excellent plateability was manufactured. It also has been indicated that, in Comparative Example 1, since the thickness of one side surface of the outer clad layer was less than that of the aluminum diffusion layer, aluminum oxide was formed on the surface of the clad steel sheet, such that plateability was deteriorated.

FIG. 3 is an image obtained by imaging an edge portion of a base material and a clad material using an optical microscope. The lightweight steel sheet, the base material, included ferrite and austenite, and the clad material included ferrite and pearlite. Pearlite of the clad material was formed by carbon diffused from the base material, and was formed up to 60 μm on a boundary and did not affect plateability. Also, it has been indicated that dynamic recrystallization was completed for both the base material and the clad such that a uniform microstructure was formed.

Figure 4:
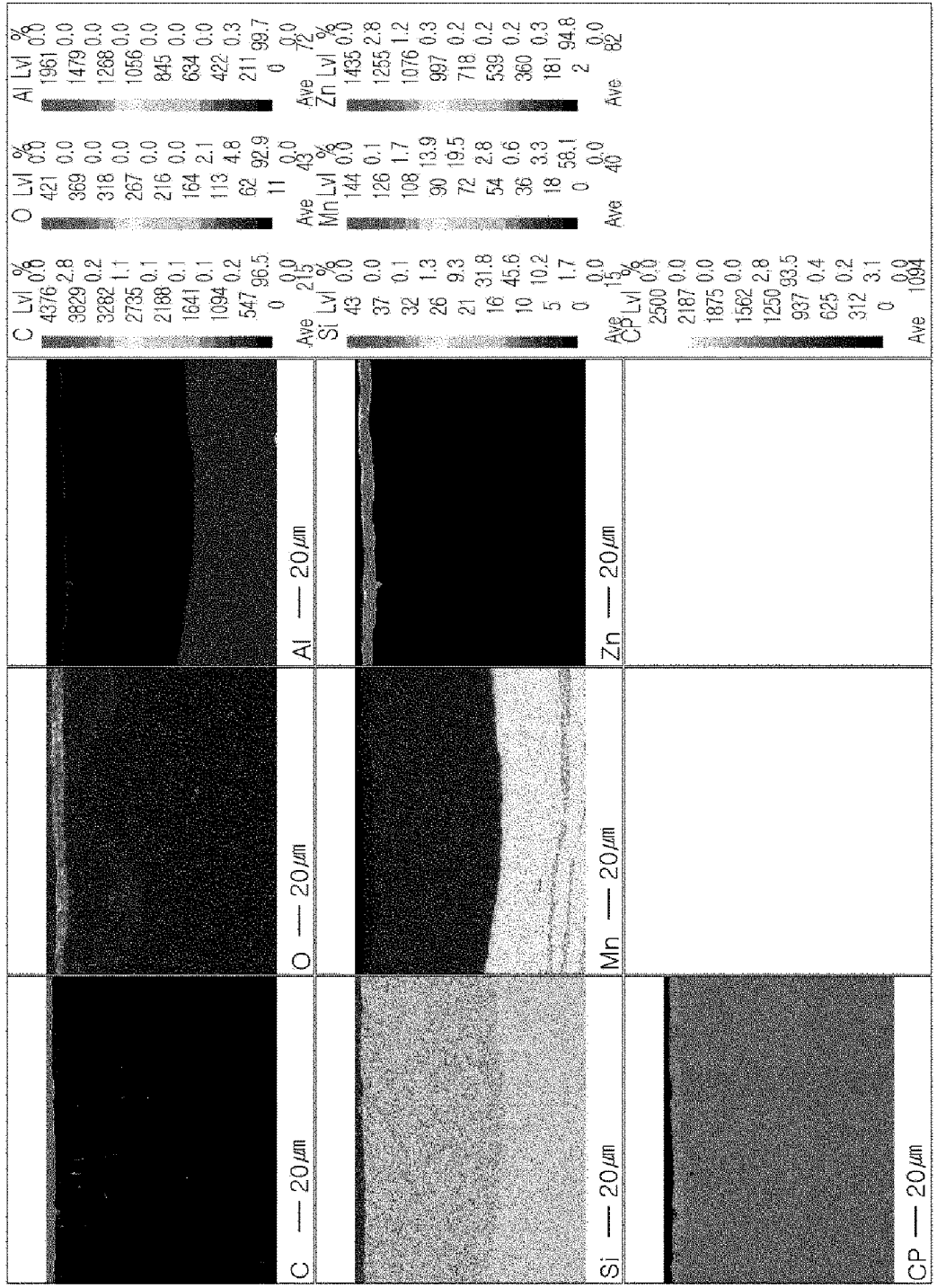
FIG. 4 is an image obtained using a scanning electron microscope, illustrating an element distribution state of a clad steel sheet including a plating layer.

FIG. 4 is an image obtained using a scanning electron microscope, illustrating an element distribution state of a clad steel sheet including a plating layer. As indicated in FIG. 4, it has been indicated that oxide was not observed between the base material and the clad material, and that a galvanized layer was uniformly formed on the surface of the clad material.

Figure 5:
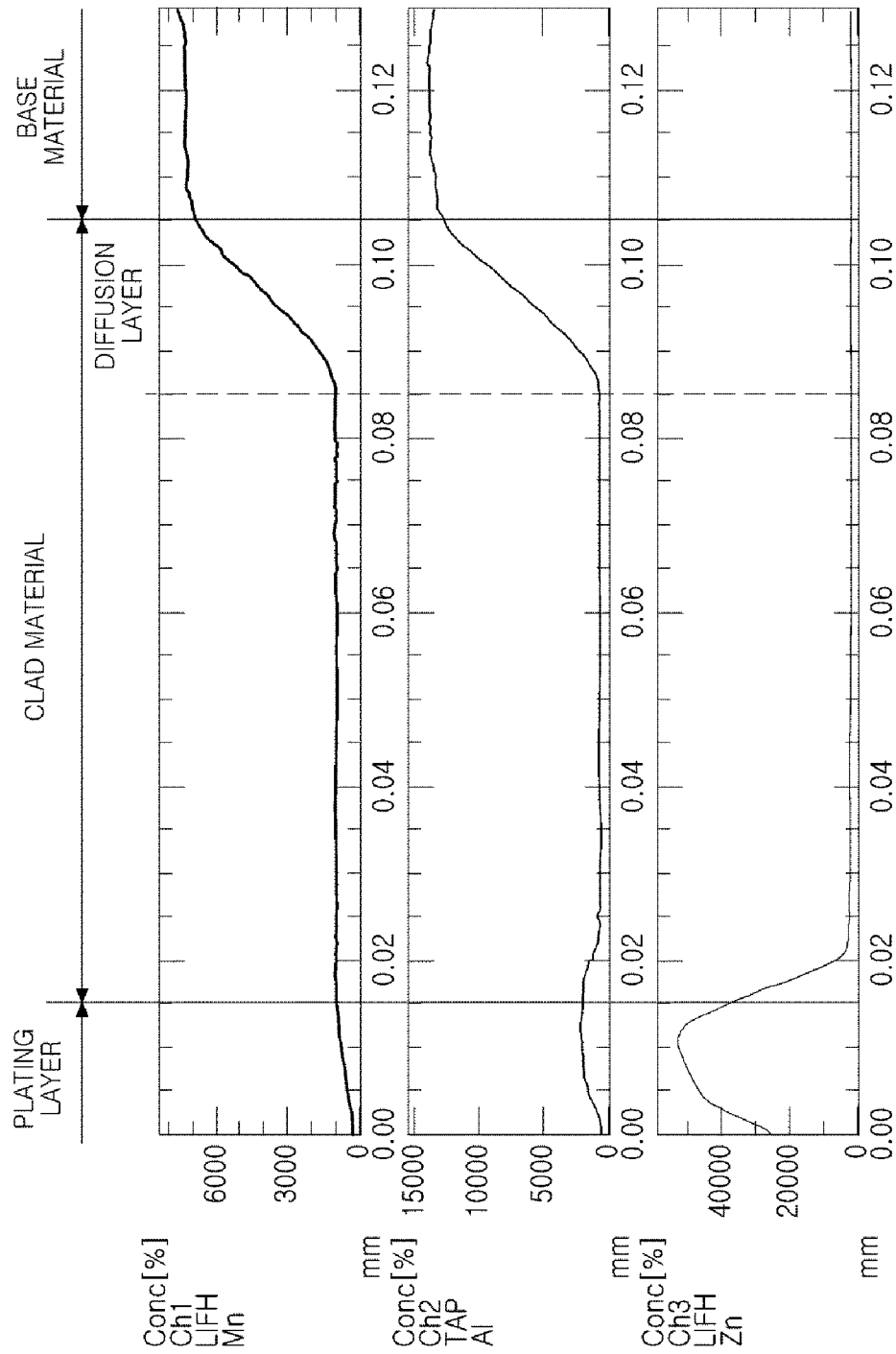
FIG. 5 is a graph illustrating measurement of an element distribution state crossing from a plating layer to a base material with respect to the clad steel sheet of inventive example 1.

FIG. 5 is a graph illustrating measurement of an element distribution state crossing from a plating layer to a base material with respect to the clad steel sheet of inventive example 1. It has been indicated that a layer in which manganese and aluminum were diffused to the clad material had a thickness of about 20 μm in the vicinity of the interfacial surface between the clad material and the base material.

While the present disclosure has been described in detail through embodiments, it will be apparent that embodiments different from the above embodiments could be made. Thus, the technical idea and the scope of the claims set forth below will not be limited to the embodiments.

The invention claimed is:

1. A clad steel sheet, comprising:
   a base material; and
   a clad material provided on both side surfaces of the base material,
   wherein the base material is a ferrite-austenitic duplex steel sheet including, by weight %, C: 0.3-0.7%, Mn: 2.0-9.0%, Al: 4.5-8.0%, and a balance of Fe and inevitable impurities, and
   wherein the clad material is ferrite carbon steel including, by weight %, C: 0.0005-0.2%, Mn: 0.05-2.5%, and a balance of Fe and inevitable impurities.

2. The clad steel sheet of claim 1, wherein the ferrite-austenitic duplex steel sheet further includes, by weight %, Si: 0.03-2.0%, Ni: 0.1-4.0%, N: 0.04% or less excluding 0%, P: 0.03% or less, and S: 0.03% or less.

3. The clad steel sheet of claim 1, wherein the ferrite carbon steel further includes, by weight %, Al: 0.01-0.1%, N: 0.04% or less excluding 0%, P: 0.03% or less, and S: 0.03% or less.

4. The clad steel sheet of claim 3, wherein the ferrite carbon steel further includes, by weight %, one or more of Si: 0.03-2.0%, Ti: 0.005-0.05%, and Nb: 0.005-0.05%.

5. The clad steel sheet of claim 1, wherein a thickness of the clad material on one side surface of the base material is 25 μm or more, and a sum of thicknesses of the clad material on the both side surfaces of the base material is 30% or less of a total thickness of the clad steel sheet.

6. The clad steel sheet of claim 1, wherein the clad steel sheet has a tensile strength of 780 MPa or more and a density of 7.4 g/cm$^3$ or less.

7. The clad steel sheet of claim 1, wherein a microstructure of the ferrite-austenitic duplex steel sheet includes 10-50% of retained austenite in a ferrite matrix by area fraction.

8. The clad steel sheet of claim 1, wherein a microstructure of the ferrite carbon steel has ferrite as a matrix structure and includes one or more of carbide, pearlite, martensite, and bainite as a second phase.

9. The clad steel sheet of claim 1, wherein the clad steel sheet further includes a plating layer formed on a surface of the clad material.

10. The clad steel sheet of claim 9, wherein the plating layer is one selected from the group consisting of Zn, Zn—Fe, Zn—Al, Zn—Mg, Zn—Mg—Al, Zn—Ni, Al—Si, and Al—Si—Mg.

11. A method of manufacturing a steel sheet, the method comprising:
    preparing a base material, a ferrite-austenitic duplex steel sheet including, by weight %, C: 0.3-0.7%, Mn: 2.0-9.0%, Al: 4.5-8.0%, and a balance of Fe and inevitable impurities;
    preparing a clad material, ferrite carbon steel including, by weight %, C: 0.0005-0.2%, Mn: 0.05-2.5%, and a balance of Fe and inevitable impurities;
    obtaining a laminate by disposing the base material between the two clad materials;
    welding an edge of the laminate and heating the laminate in a temperature range of 1050-1350° C.;
    obtaining a hot rolled steel sheet by finish-rolling the heated laminate in a temperature range of 750-1050° C.;
    coiling the hot rolled steel sheet at 350-700° C.;
    obtaining a cold rolled steel sheet by pickling the coiled hot rolled steel sheet and performing cold-rolling by applying a cold rolling reduction ratio of 35-90%; and
    annealing the cold rolled steel sheet in a temperature range of 550° C. or higher and A3+50° C. or lower of the clad material.

12. The method of claim 11, wherein the method further includes forming a plating layer by performing plating by a hot dip plating method after the annealing.

13. The method of claim 12, wherein the plating layer is one selected from the group consisting of Zn, Zn—Fe, Zn—Al, Zn—Mg, Zn—Mg—Al, Zn—Ni, Al—Si, and Al—Si—Mg.

* * * * *